United States Patent
Shimada

[11] Patent Number: 5,930,059
[45] Date of Patent: Jul. 27, 1999

[54] REFLECTION MIRROR EQUIPPED WITH A LUMINANCE SENSOR

[75] Inventor: Takehiko Shimada, Yokohama, Japan

[73] Assignee: Equestrian Co., Ltd., Tokyo, Japan

[21] Appl. No.: 09/002,492

[22] Filed: Jan. 2, 1998

[51] Int. Cl.[6] .......................... G01N 21/55; G01N 21/47; G02B 7/182

[52] U.S. Cl. .......................... 359/871; 356/445; 356/446

[58] Field of Search .................................... 359/838, 871; 356/446, 445

[56] References Cited

U.S. PATENT DOCUMENTS

| | | | |
|---|---|---|---|
| 4,099,051 | 7/1978 | Gugliotta | 356/446 |
| 5,605,838 | 2/1997 | Backhaus et al. | 356/445 |

Primary Examiner—Cassandra Spyrou
Assistant Examiner—Jennifer Winstedt
Attorney, Agent, or Firm—McDermott, Will & Emery

[57] ABSTRACT

A reflection mirror includes a reflection mirror body and a photo sensor for luminance measurement. The reflection mirror body has a three-dimensional curved reflection surface that receives light from a light source and reflects the light toward an object to be illuminated. The reflection mirror body also has a through hole in the vicinity of the center of the reflection surface. The center axis of the through hole is substantially parallel to a light path between the refection mirror body and the object but perpendicularly intersects a light path between the light source and the reflection mirror body. The photo sensor is received within the through hole and adapted to measure the luminance of an illuminated surface of the object.

9 Claims, 2 Drawing Sheets

REFLECTION MIRROR EQUIPPED WITH A LUMINANCE SENSOR

BACKGROUND OF THE INVENTION

1. Field of the Invention

The present invention relates to a reflection mirror equipped with a luminance sensor, which is capable of reflecting light from a light source toward an object to be illuminated while measuring the luminance on the object.

2. Description of the Related Art

Reflection mirrors have been used in various apparatus, such as an exposing apparatus used for the manufacture of printed circuit boards.

Such reflection mirrors are made of a bright material such as aluminum alloy. For example, aluminum alloy plate is polished to improve brightness and is then attached to the curved reflection surface of a reflection mirror. Alternatively, an aluminum alloy block is machined to have a curved reflection surface, and the curved reflection surface is plated with chromium in order to improve the brightness. In order to obtain further improved brightness, the curved surface is plated first with nickel and then with chromium. Further, a multi-layer coating is vacuum deposited together with a black heat absorbing layer in order to enable the reflection mirror to sustain overheat stamming from infrared rays.

When the above-described reflection mirror is used to reflect light from a light source toward an object to be illuminated, the luminance on the illuminated surface of the object changes slightly according to the conditions of the reflection surface and the like. Therefore, mere visual check cannot be used to determine whether the object is properly illuminated. Moreover, the object cannot be illuminated properly unless a carefully selected mirror is used.

SUMMARY OF THE INVENTION

An object of the present invention is to solve the above-mentioned problems and to provide an improved reflection mirror equipped with a luminance sensor.

To achieve the above object, the present invention provides a reflection mirror which includes a reflection mirror body and sensing means for luminance measurement. The reflection mirror body has a reflection surface for receiving light from a light source and reflecting the light toward an object to be illuminated. The reflection mirror body also has a through hole whose center axis is substantially parallel to a light path between the refection mirror body and the object but intersects a light path between the light source and the reflection mirror body. The sensing means is received within the through hole and adapted to measure the luminance of an illuminated surface of the object.

Preferably, the through hole is positioned in the vicinity of the center of the reflection surface of the reflection mirror in order to measure the luminance of the illuminated surface at the center thereof.

The sensing means may be a photo sensor or an optical fiber coupled with a photo sensor disposed outside the reflection mirror body.

Since the luminance sensor is obliquely attached to the reflection mirror such that the luminance sensor is directed to a desired point (e.g., the center) of the illuminated surface of an object to be illuminated, the luminance of the illuminated surface of the object can be measured accurately through use of a simple structure. Therefore, if the reflection mirror of the present invention is used for luminance inspection, accurate measurement by the reflection mirror enables selection of a reflection mirror that satisfies the requirements of illumination. Further, the accurate measurement enables selection of a proper lamp to serve as a light source. When the reflection mirror is used as an ordinary reflection mirror, the luminance measured by the luminance sensor is used for feedback control such that a light source is controlled to make the luminance constant.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

An embodiment of the present invention will now be described with reference to the drawings.

Figure 1:
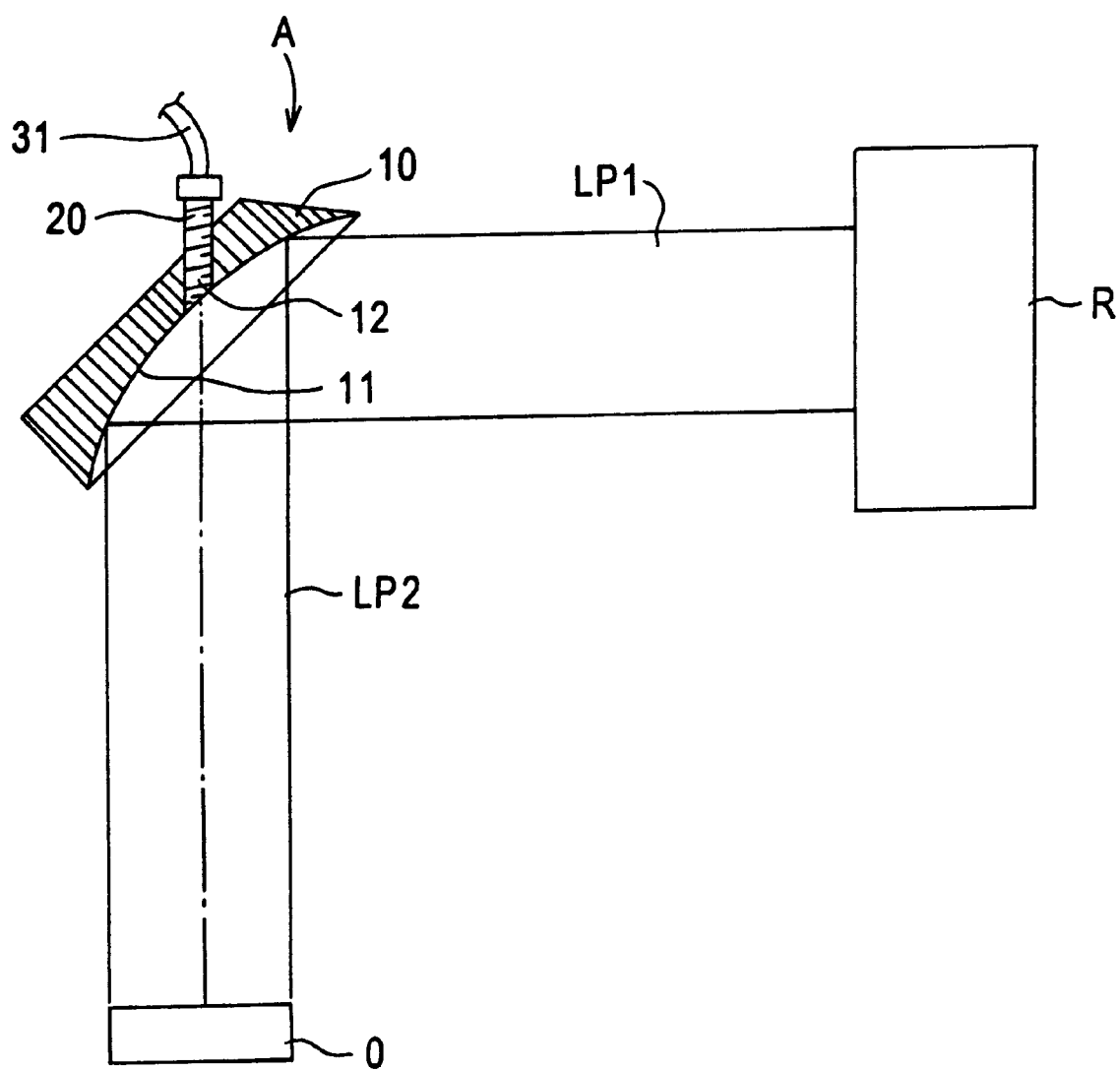
FIG. 1 is a schematic view showing the overall structure of an illumination system that utilizes a reflection mirror according to the present invention.
Figure 2:
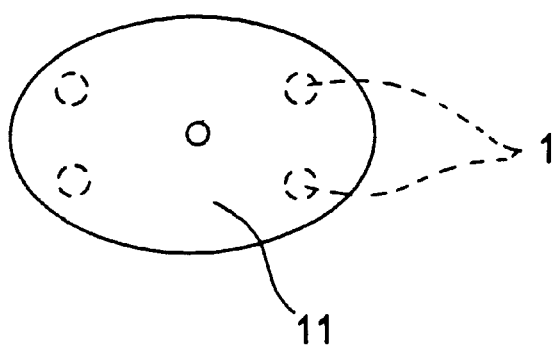
FIG. 2 is a front view of the reflection mirror shown in FIG. 1.
Figure 3:
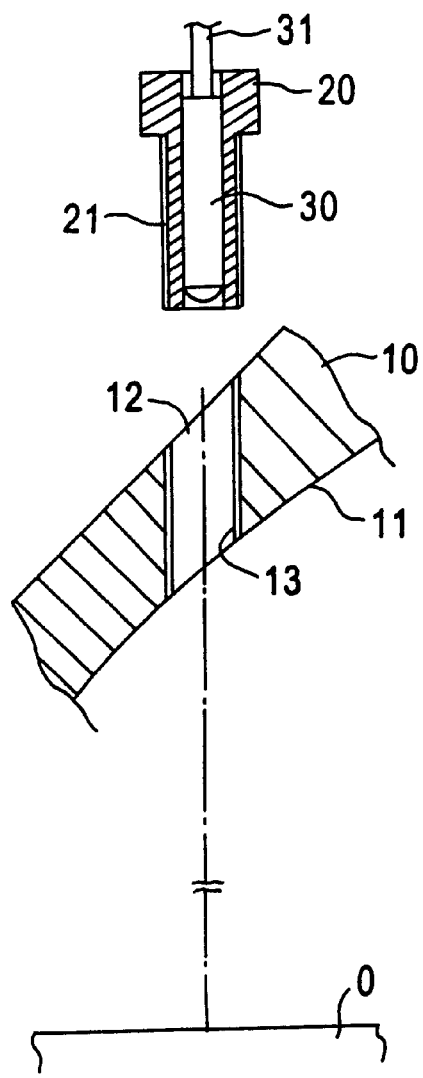
FIG. 3 is an enlarged cross section of a main portion of the reflection mirror shown in FIG. 1.

FIGS. 1–3 show an illumination system that utilizes a reflection mirror according to the present invention.

The illumination system shown in FIG. 1 includes a light source R and a reflection mirror A. The reflection mirror A is mainly composed of a reflection mirror body 10 and an luminance sensor 30 (see FIG. 3). The light source R radiates uniform light that travels along a light path LP1. The reflection mirror body 10 has a curved reflection surface 11 and is disposed such that it intersects the light path LP1 at an angle of 45°. Thus, the light reflected by the reflection mirror body 10 travels along a light path LP2 perpendicular to the light path LP1 and reaches an object O to be illuminated.

The reflection mirror body 10 is made from a bright material such as aluminum alloy. In the present embodiment, an aluminum alloy block is machined to have a curved reflection surface, and the curved reflection surface is plated with chromium in order to improve the brightness. In order to further improve the brightness, the curved surface may be plated first with nickel and then with chromium. Alternatively, aluminum alloy plate is polished to improve its brightness and is then attached to the reflection surface of a reflection mirror body made of a different material. Preferably, the curved reflection surface is a three-dimensional curved surface such that the object O receives uniform light. In FIG. 2, numeral 1 denotes a plurality of attachment holes formed in the rear side of the reflection mirror body 10. The reflection mirror body 10 is attached to an unillustrated unit body by use of unillustrated bolts that are screwed into the attachment holes 1.

A through hole 12 is formed in the reflection mirror body 10 in the vicinity of the center of the reflection surface. The through hole 12 is inclined relative to the reflection surface 11 such that the center axis of the through hole 12 is parallel to the light path LP2. A female thread 13 is formed on the inner wall of the through hole 12. A sleeve 20 having a male thread 21 on its outer periphery is threaded into the through hole 12. A photo sensor 30 serving as an luminance sensor is disposed within the sleeve 20.

The photo sensor 30 is connected to an unillustrated luminance meter via a cable 31. Thus, the amount of light received by the photo sensor 30 is measured as the luminance of the illuminated surface of the object O. Since the photo sensor 30 is disposed substantially at the center of the reflection mirror and is directed to the object O, the luminance at the center of the illuminated surface can be measured accurately. Also, since the light from the light source R does not reach the photo sensor 30 via a direct path, the light from the light source R has no adverse effect on the measurement of the luminance of the illuminated surface.

The above-described structure may be modified such that one end of a glass-fiber cable is inserted into the through hole 12 and the other end of the glass-fiber cable is coupled with a photo sensor disposed outside the reflection mirror body 10. In this case, light received from the illuminated surface reaches the photo sensor 30 via the glass-fiber cable. Therefore, luminance measurement can be performed in a similar manner.

The inclination angle of the through hole 12 or the photo sensor 30 with respect to the reflection surface may be changed in accordance with the angle between the light paths LP1 and LP2.

Obviously, numerous modifications and variations of the present invention are possible in light of the above teachings. It is therefore to be understood that within the scope of the appended claims, the present invention may be practiced otherwise than as specifically described herein.

What is claimed is:

1. A reflection mirror comprising:

a reflection mirror body having a reflection surface for receiving light from a light source and reflecting the light toward an object to be illuminated, the reflection mirror body having a through hole whose center axis is substantially parallel to a light path between the reflection mirror body and the object but intersects a light path between the light source and the reflection mirror body; and sensing means received within the through hole and adapted to measure the luminance of an illuminated surface of the object.

2. A reflection mirror according to claim 1, wherein the through hole is positioned in the vicinity of the center of the reflection surface of the reflection mirror in order to measure the luminance of the illuminated surface at the center thereof.

3. A reflection mirror according to claim 2, wherein the sensing means is a photo sensor.

4. A reflection mirror according to claim 3, wherein the reflection surface of the reflection mirror body has a curved surface.

5. A reflection mirror according to claim 3, wherein the reflection surface of the reflection mirror body has a three-dimensional curved surface.

6. A reflection mirror according to claim 2, wherein the sensing means is an optical fiber coupled with a photo sensor disposed outside the reflection mirror body.

7. A reflection mirror according to claim 6, wherein the reflection surface of the reflection mirror body has a curved surface.

8. A reflection mirror according to claim 6, wherein the reflection surface of the reflection mirror body has a three-dimensional curved surface.

9. A reflection mirror comprising:

a reflection mirror body having a three-dimensional curved reflection surface for receiving light from a light source and reflecting the light toward an object to be illuminated as well as a through hole in the vicinity of the center of the reflection surface of the reflection mirror body, the center axis of the through hole being substantially parallel to a light path between the reflection mirror body and the object but perpendicularly intersecting a light path between the light source and the reflection mirror body; and a photo sensor received within the through hole and adapted to measure the luminance of an illuminated surface of the object.

\* \* \* \* \*